United States Patent
Venkataramani et al.

(10) Patent No.: US 12,555,355 B2
(45) Date of Patent: Feb. 17, 2026

(54) SYSTEMS AND METHODS FOR ANALYZING UNCERTAINTY IN A MULTI-SCALE INTERPRETATION OF A MEDICAL IMAGE

(71) Applicant: GE Precision Healthcare LLC, Waukesha, WI (US)

(72) Inventors: Rahul Venkataramani, Bangalore (IN); Rachana Sathish, Bangalore (IN); Krishna Seetharam Shriram, Bangalore (IN); Chandan Kumar Mallappa Aladahalli, Bangalore (IN); Christian Fritz Perrey, Linz (AT); Michaela Hofbauer, Linz (AT)

(73) Assignee: GE Precision Healthcare LLC, Waukesha, WI (US)

( * ) Notice: Subject to any disclaimer, the term of this patent is extended or adjusted under 35 U.S.C. 154(b) by 385 days.

(21) Appl. No.: 18/364,101

(22) Filed: Aug. 2, 2023

(65) Prior Publication Data
US 2025/0046057 A1  Feb. 6, 2025

(51) Int. Cl.
*G06V 10/764* (2022.01)
*G06T 7/00* (2017.01)
*G06T 7/11* (2017.01)
*G06V 10/82* (2022.01)

(52) U.S. Cl.
CPC .......... *G06V 10/764* (2022.01); *G06T 7/0012* (2013.01); *G06T 7/11* (2017.01); *G06V 10/82* (2022.01); *G06T 2207/10132* (2013.01); *G06T 2207/20084* (2013.01); *G06T 2207/30096* (2013.01); *G06V 2201/03* (2022.01)

(58) Field of Classification Search
None
See application file for complete search history.

(56) References Cited

U.S. PATENT DOCUMENTS

| | | | |
|---|---|---|---|
| 2020/0082534 A1* | 3/2020 | Nikolov | G06T 7/11 |
| 2021/0248408 A1* | 8/2021 | Deng | G06T 7/13 |

OTHER PUBLICATIONS

Mehta et al., "Y-Net: Joint Segmentation and Classication for Diagnosis of Breast Biopsy Images," 2018, 9 pgs.

(Continued)

*Primary Examiner* — Lennin R Rodriguezgonzalez
(74) *Attorney, Agent, or Firm* — Fletcher Yoder, P.C.

(57) ABSTRACT

A method for analyzing uncertainty in a multi-scale interpretation of a medical image includes inputting the medical image into a trained segmentation network. The method includes outputting via the trained segmentation network a segmentation output mask for each pixel of the medical image or a region of interest of the medical image. The method includes utilizing a deterministic function to aggregate segmentation output masks for all pixels of the medical image or the region of interest and to output a first classification prediction of the aggregated segmentation output masks. The method includes inputting the medical image into a trained classification network. The method includes outputting a second classification prediction of the medical image or the region of interest. The method includes determining an uncertainty between the first classification prediction and the second classification prediction via comparison of the first classification prediction to the second classification prediction.

20 Claims, 6 Drawing Sheets

(56) References Cited

OTHER PUBLICATIONS

Ren et al., "Uncertainty-informed Mutual Learning for Joint Medical Image Classication and Segmentation," Mar. 30, 2023, 10 pgs.
He et al., "Mask R-CNN," Computer Vision Foundation, 9 pgs.
Zimmer et al., "Placenta Segmentation in Ultrasound Imaging: Addressing Sources of Uncertainty and Limited Field-of-View," Elsevier, Mar. 9, 2022, 21 pgs.

* cited by examiner

Segmentation Prediction: Multilocular
Classification Prediction: Multilocular
GT: Multi-Locular

FIG. 6

Segmentation Prediction: Solid
Classification Prediction: Solid
GT: Solid

FIG. 7

Segmentation Prediction: Unilocular
Classification Prediction: Unilocular
GT: Unilocular

SYSTEMS AND METHODS FOR ANALYZING UNCERTAINTY IN A MULTI-SCALE INTERPRETATION OF A MEDICAL IMAGE

BACKGROUND

The subject matter disclosed herein relates to image processing and, more particularly, systems and methods for analyzing uncertainty in a multi-scale interpretation of a medical image.

An ultrasound device may be used for imaging targets such as organs and soft tissues in a human body, as well non-human targets. For example, an ultrasound device may be used for applications such as ultrasound/acoustic sensing, non-destructive evaluation (NDE), ultrasound therapy (e.g., High Intensity Focused Ultrasound (HIFU)), etc., in addition to ultrasound imaging of humans, animals, etc.

Ultrasound devices may use real time, non-invasive high frequency sound waves to produce a series of two-dimensional (2D) and/or three-dimensional (3D) images. The sound waves may be transmitted by a transmit transducer, and the reflections of the transmitted sound waves may be received by a receive transducer. The received sound waves may then be processed to display an image of the target. These images may be analyzed. However, sometimes the analysis of the images may be uncertain and the reason for this uncertainty is not explained or readily apparent to the user (e.g., clinician).

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for analyzing uncertainty in a multi-scale interpretation of a medical image is provided. The computer-implemented method includes inputting, via a processor, the medical image into a trained segmentation network. The computer-implemented method also includes outputting, via the processor, via the trained segmentation network a segmentation output mask for each pixel of the medical image or a region of interest of the medical image. The computer-implemented method further includes utilizing, via the processor, a deterministic function to aggregate segmentation output masks for all pixels of the medical image or the region of interest and to output a first classification prediction of the aggregated segmentation output masks. The computer-implemented method even further includes inputting, via the processor, the medical image into a trained classification network. The computer-implemented method yet further includes outputting, via the processor, a second classification prediction of the medical image or the region of interest. The computer-implemented method still further includes determining, via the processor, an uncertainty between the first classification prediction and the second classification prediction via comparison of the first classification prediction to the second classification prediction.

In one embodiment, the computer-implemented method includes providing, via the processor, a user-perceptible indication of the uncertainty when present between the first classification prediction and the second classification prediction.

In one embodiment, providing the user-perceptible indication includes causing a display of an explanation of the uncertainty in clinical terminology for a user.

In one embodiment, the computer-implemented method includes providing, via the processor, a recommendation to a user to potentially remedy the uncertainty.

In one embodiment, the computer-implemented method includes automatically altering, via the processor, one or more parameters related to the medical imaging and then repeating analysis of the medical image.

In one embodiment, the computer-implemented method includes outputting, via the processor, via the trained segmentation network the segmentation output mask for each pixel of the region of interest. The computer-implemented method also includes utilizing, via the processor, the deterministic function to aggregate segmentation output masks for all pixels of the region of interest and to output the first classification prediction of the aggregated segmentation output masks. The computer-implemented method further includes outputting, via the processor, the second classification prediction of the region of interest.

In one embodiment, the medical image includes an ultrasound image and the region of interest includes an ovarian lesion.

In one embodiment, labels to utilized for both the first classification prediction and the second classification prediction and the second classification prediction include unilocular ovarian lesion, multilocular ovarian lesion, and sold ovarian lesion.

In one embodiment, the computer-implemented method includes outputting, via the processor, via the trained segmentation network the segmentation output mask for each pixel of the medical image. The computer-implemented method also includes utilizing, via the processor, the deterministic function to aggregate segmentation output masks for all pixels of the medical image and to output the first classification prediction of the aggregated segmentation output masks. The computer-implemented method further included outputting, via the processor, the second classification prediction of the medical image.

In one embodiment, the medical image includes an ultrasound image.

In one embodiment, labels to be utilized for both the first classification prediction and the second classification prediction include presence of a lesion and absence of a lesion.

In another embodiment, a system for analyzing uncertainty in a multi-scale interpretation of a medical image is provided. The system includes a memory encoding processor-executable routines. The system also includes a processor configured to access the memory and to execute the processor-executable routines, wherein the routines, when executed by the processor, cause the processor to perform actions. The actions include inputting the medical image into a trained segmentation network. The actions also include outputting via the trained segmentation network a segmentation output mask for each pixel of a region of interest of the medical image. The actions further include utilizing a deterministic function to aggregate segmentation output masks for all pixels of region of interest and to output a first classification prediction of the aggregated segmentation output masks. The actions even further include inputting the medical image into a trained classification network, wherein the trained classification network is a separate network from the trained segmentation network or both the trained classification network and the trained segmentation network are part of the same network. The actions still further include outputting a second classification prediction of the region of interest. The actions yet further include determining an uncertainty between the first classification prediction and the second classification prediction via comparison of the first classification prediction to the second classification prediction.

In one embodiment, the actions include causing the processor to provide a user-perceptible indication of the uncertainty when present between the first classification prediction and the classification prediction.

In one embodiment, providing the user-perceptible indication includes causing display of an explanation of the uncertainty in clinical terminology for a user.

In one embodiment, the actions include further causing the processor to provide a recommendation to a user to potentially remedy the uncertainty.

In one embodiment, the actions include further casing the processor to automatically alter one or more parameters related to the medical image and then repeating analysis of the medical image.

In one embodiments, the actions include outputting via the trained segmentation network the segmentation output mask for each pixel of the region of interest. The actions also include utilizing the deterministic function to aggregate segmentation output masks for all pixels of the region of interest and to output the first classification prediction of the aggregated segmentation output masks. The actions further include outputting the second classification prediction of the region of interest.

In one embodiment, the medical image includes an ultrasound image and the region of interest includes an ovarian lesion.

In one embodiment, labels to utilized for both the first classification prediction and the second classification prediction and the second classification prediction include unilocular ovarian lesion, multilocular ovarian lesion, and sold ovarian lesion.

In one embodiment, the actions include outputting, via the processor, via the trained segmentation network the segmentation output mask for each pixel of the medical image. The actions also includes utilizing the deterministic function to aggregate segmentation output masks for all pixels of the medical image and to output the first classification prediction of the aggregated segmentation output masks. The actions further included outputting the second classification prediction of the medical image.

In one embodiment, the medical image includes an ultrasound image.

In one embodiment, labels to be utilized for both the first classification prediction and the second classification prediction include presence of a lesion and absence of a lesion.

In a further embodiment, a non-transitory computer-readable medium, the computer-readable medium including processor-executable code that when executed by a processor, causes the processor to perform actions. The actions include inputting a medical image into a trained segmentation network. The actions also include outputting via the trained segmentation network a segmentation output mask for each pixel of the medical image or a region of interest of the medical image. The actions further include utilizing a deterministic function to aggregate segmentation output masks for all pixels of the medical image or the region of interest and to output a first classification prediction of the aggregated segmentation output masks. The actions even further include inputting the medical image into a trained classification network. The actions still further include outputting a second classification prediction of the medical image or the region of interest. The actions yet further include determining an uncertainty between the first classification prediction and the second classification prediction via comparison of the first classification prediction to the second classification prediction.

In one embodiment, the actions further cause the processor to provide a user-perceptible indication of the uncertainty when present between the first classification prediction and the second classification prediction.

In one embodiment, providing the user-perceptible indication includes causing display of an explanation of the uncertainty in clinical terminology to the user.

In one embodiment, the actions further include causing the processor to provide a recommendation to a user to potentially remedy the uncertainty.

In one embodiment, the actions include further casing the processor to automatically alter one or more parameters related to the medical image and then repeating analysis of the medical image.

In one embodiments, the actions include outputting via the trained segmentation network the segmentation output mask for each pixel of the region of interest. The actions also include utilizing the deterministic function to aggregate segmentation output masks for all pixels of the region of interest and to output the first classification prediction of the aggregated segmentation output masks. The actions further include outputting the second classification prediction of the region of interest.

In one embodiment, the medical image includes an ultrasound image and the region of interest includes an ovarian lesion.

In one embodiment, labels to utilized for both the first classification prediction and the second classification prediction and the second classification prediction include unilocular ovarian lesion, multilocular ovarian lesion, and sold ovarian lesion.

In one embodiment, the actions include outputting, via the processor, via the trained segmentation network the segmentation output mask for each pixel of the medical image. The actions also includes utilizing the deterministic function to aggregate segmentation output masks for all pixels of the medical image and to output the first classification prediction of the aggregated segmentation output masks. The actions further included outputting the second classification prediction of the medical image.

In one embodiment, the medical image includes an ultrasound image.

In one embodiment, labels to be utilized for both the first classification prediction and the second classification prediction include presence of a lesion and absence of a lesion.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Some generalized information is provided to provide both general context for aspects of the present disclosure and to facilitate understanding and explanation of certain of the technical concepts described herein.

As used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode (2D mode), M-mode, three-dimensional (3D) mode, CF-mode, PW Doppler, CW Doppler, MGD, and/or sub-modes of B-mode and/or CF such as Shear Wave Elasticity Imaging (SWEI), TVI, Angio, B-flow, BMI, BMI_Angio, and in some cases also MM, CM, TVD where the "image" and/or "plane" includes a single beam or multiple beams.

Furthermore, the term processor or processing unit, as used herein, refers to any type of processing unit that can carry out the required calculations needed for the various embodiments, such as single or multi-core: CPU, Accelerated Processing Unit (APU), Graphics Board, DSP, FPGA, ASIC or a combination thereof.

Deep-learning (DL) approaches discussed herein may be based on artificial neural networks, and may therefore encompass one or more of deep neural networks, fully connected networks, convolutional neural networks (CNNs), unrolled neural networks, perceptrons, encoders-decoders, recurrent networks, transformer networks, wavelet filter banks, u-nets, general adversarial networks (GANs), dense neural networks (e.g., residual dense networks (RDNs), or other neural network architectures. The neural networks may include shortcuts, activations, batch-normalization layers, and/or other features. These techniques are referred to herein as deep-learning techniques, though this terminology may also be used specifically in reference to the use of deep neural networks, which is a neural network having a plurality of layers.

As discussed herein, deep-learning techniques (which may also be known as deep machine learning, hierarchical learning, or deep structured learning) are a branch of machine learning techniques that employ mathematical representations of data and artificial neural networks for learning and processing such representations. By way of example, deep-learning approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

In the domain of medical image analysis, uncertainty estimation (e.g., via an artificial intelligence model) of a medical image may not be accompanied with clinical insight which the user (e.g., radiologist or sonographer) can utilize. In the disclosed systems and methods, clinical information stemming from image classification is vetted by image segmentation with both operating at different image scales to explain uncertainty in prediction. In particular, the segmentation and classification of the images operate on the image data at different scales. While image classification typically provides a single categorical label to an image, image segmentation provides labels for each of the pixels that constitute the image. However, in certain instances, the segmented regions taken together can help deduce the class label for the image. Classification is considered top-down labeling of an image, while deducing the class label through an agglomeration of segmentation masks is considered a bottom-up method for achieving the same. Disagreements between the two can be determined as uncertainty in model performance. In medical image analysis, this can be used to alert the user (e.g., clinician) to consider this uncertainty in making any decision.

The present disclosure provides for systems and methods for analyzing uncertainty in a multi-scale interpretation of a medical image. In particular, the disclosed systems and methods include inputting a medical image into a trained segmentation network. The disclosed systems and methods also include outputting via the trained segmentation network a segmentation output mask for each pixel of the medical image or a region of interest of the medical image. The disclosed systems and methods further include utilizing a deterministic function to aggregate segmentation output masks for all pixels of the medical image or the region of interest and to output a first classification prediction of the aggregated segmentation output masks. The disclosed systems and methods even further include inputting the medical image into a trained classification network. In certain embodiments, the trained classification network is a separate network from the trained segmentation network. In certain embodiments, the trained classification network and the trained segmentation network are part of the same network. The disclosed systems and methods still further include outputting a second classification prediction of the medical image or the region of interest. The disclosed systems and methods yet further include determining an uncertainty between the first classification prediction and the second classification prediction via comparison of the first classification prediction to the second classification prediction.

In certain embodiments, a user-perceptible indication of the uncertainty when present between the first classification prediction and the second classification prediction is provided. In certain embodiments, providing the user-perceptible indication includes causing display of an explanation of the uncertainty in clinical terminology for a user. In certain embodiments, a recommendation is provided to a user to potentially remedy the uncertainty. For example, the remedy may include altering one or more parameters related to the medical image (e.g., altering a filter (e.g., gradient filter) for segmentation or changing a segmentation model utilized). In certain embodiments, these one or more parameters may be automatically altered (e.g., without letting the user know) and the analysis (segmentation, classification, uncertainty determination, etc.) of the medical image repeated.

In certain embodiments, the medical image may be an ultrasound image. In certain embodiments, an entirety of the ultrasound image may be analyzed. In particular, an entirety of the ultrasound image may be analyzed (and an uncertainty determination applied to the analysis) for the presence or absence of a lesion (e.g., tumor). In certain embodiments, a region of interest within the ultrasound image may be analyzed (an uncertainty determination applied to the analysis) for the type of lesion (e.g., for example type of ovarian lesion such as unilocular lesion, multilocular lesion, solid lesion, etc.).

In the disclosed embodiments, the clinician (e.g., sonographer or radiologist) is alerted when there is uncertainty (e.g., disagreement between the classification label and the segmentation derived label) in the model performance (e.g., for medical image analysis). In cases where uncertainty exists, this uncertainty can be explained in clinical terminology for the benefit of the end-user so that the user can take control or take appropriate action (in light of the explanation of the uncertainty) to achieve a better clinical outcome. Although the disclosed techniques are discussed in the context of analysis of ultrasound images, the disclosed techniques may be utilized on any medical images (e.g., derived from conventional X-ray imaging, computed tomography (CT) imaging, nuclear medicine (NM) imaging, magnetic resonance imaging (MRI), or other type of imaging modality).

Figure 1:
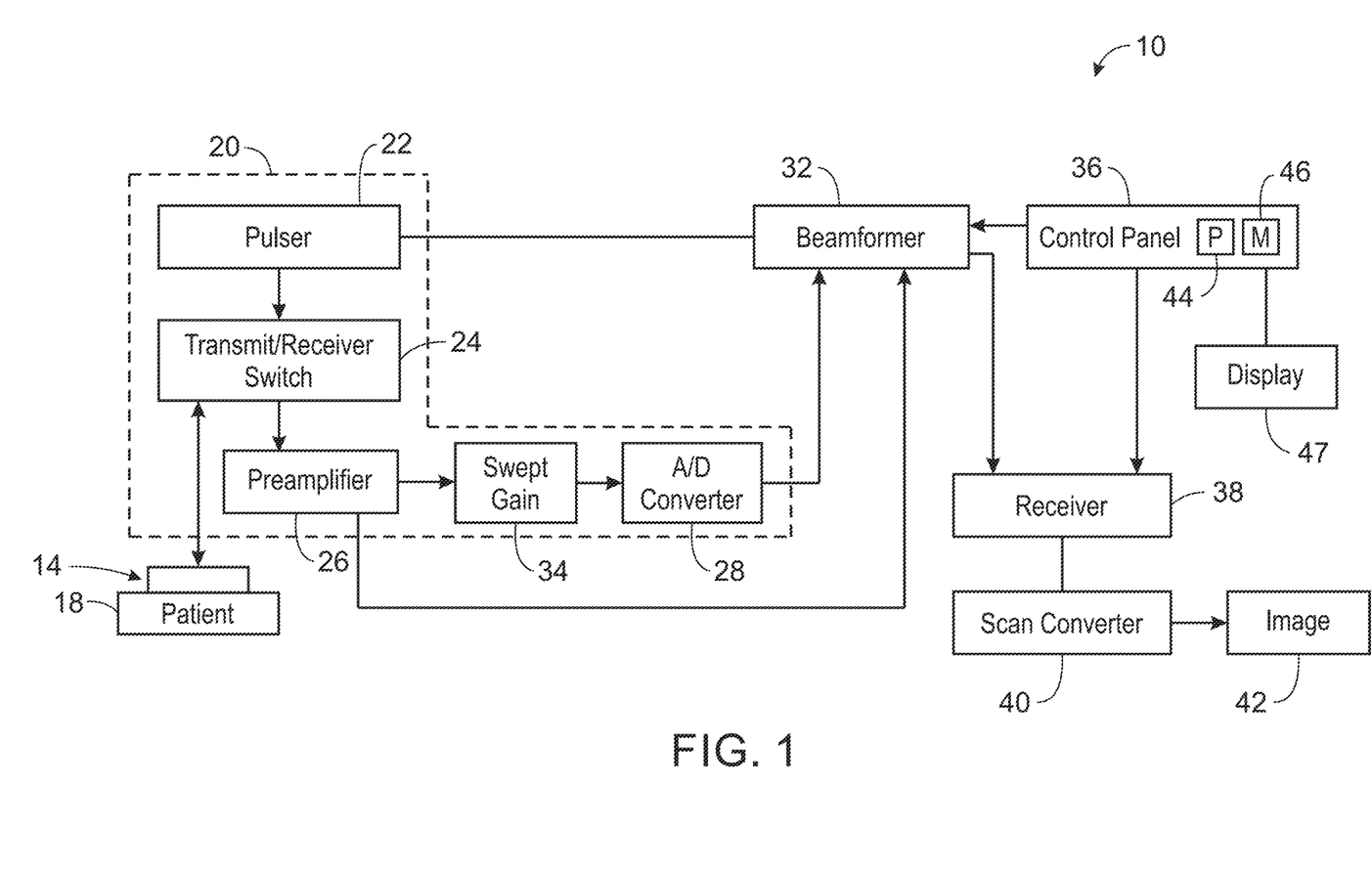
FIG. 1 is a block diagram of an ultrasound system, in accordance with aspects of the present disclosure.

With the preceding in mind, and by way of providing useful context, FIG. 1 depicts a high-level view of components of an ultrasound system 10 that may be employed in accordance with the present approach. The illustrated ultrasound system 10 includes a transducer array 14 having transducer elements suitable for contact with a subject or patient 18 during an imaging procedure. The transducer array 14 may be configured as a two-way transducer capable of transmitting ultrasound waves into and receiving such energy from the subject or patient 18. In such an implementation, in the transmission mode the transducer array elements convert electrical energy into ultrasound waves and transmit it into the patient 18. In reception mode, the transducer array elements convert the ultrasound energy received from the patient 18 (backscattered waves) into electrical signals.

Each transducer element is associated with respective transducer circuitry, which may be provided as one or more application specific integrated circuits (ASICs) 20, which may be present in a probe or probe handle. That is, each transducer element in the array 14 is electrically connected to a respective pulser 22, transmit/receive switch 24, pre-amplifier 26, swept gain 34, and/or analog to digital (A/D) converter 28 provided as part of or on an ASIC 20. In other implementations, this arrangement may be simplified or otherwise changed. For example, components shown in the circuitry 20 may be provided upstream or downstream of the depicted arrangement, however, the basic functionality depicted will typically still be provided for each transducer element. In the depicted example, the referenced circuit functions are conceptualized as being implemented on a single ASIC 20 (denoted by dashed line), however it may be appreciated that some or all of these functions may be provided on the same or different integrated circuits.

Also depicted in FIG. 1, a variety of other imaging components are provided to enable image formation with the ultrasound system 10. Specifically, the depicted example of an ultrasound system 10 also includes a beam former 32, a control panel 36, a receiver 38, and a scan converter 40 that cooperate with the transducer circuitry to produce an image or series of images 42 that may be stored and/or displayed to an operator or otherwise processed as discussed herein. The transducer array 14 may be communicate the ultrasound data to the beam-former via a wired connection or wireless connection (e.g., via a wireless communication unit that is part of the transducer array that communicates over a wi-fi network, utilizing Bluetooth® technique, or some other manner).

A processing component 44 (e.g., a microprocessor or processing circuitry) and a memory 46 of the system 10, such as may be present control panel 36, may be used to execute stored software code, instructions, or routines for processing the acquired ultrasound signals to generate meaningful images and/or motion frames, which may be displayed on a display 47 of the ultrasound system 10. The term "code" or "software code" used herein refers to any instructions or set of instructions that control the ultrasound system 10. The code or software code may exist in a computer-executable form, such as machine code, which is the set of instructions and data directly executed by the processing component 44 of the control panel 36, human-understandable form, such as source code, which may be compiled in order to be executed by the processing component 44 of the control panel 36, or an intermediate form, such as object code, which is produced by a compiler. In some embodiments, the ultrasound system 10 may include a plurality of controllers.

As an example, the memory 46 may store processor-executable software code or instructions (e.g., firmware or software), which are tangibly stored on a non-transitory computer readable medium. Additionally or alternatively, the memory 46 may store data. As an example, the memory 46 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, processing component 44 may include multiple microprocessors, one or more "general-purpose" microprocessors, one or more special-purpose microprocessors, and/or one or more application specific integrated circuits (ASICS), or some combination thereof. For example, the processing component 44 may include one or more reduced instruction set (RISC) or complex instruction set (CISC) processors. The processing component 44 may include multiple processors, and/or the memory 46 may include multiple memory devices.

The processing component 44 may analyze uncertainty in a multi-scale interpretation of a medical image. In particular, the processing component 44 may inputting a medical image into a trained segmentation network. The processing component 44 may input a medical image into a trained segmentation network and output via the trained segmentation network a segmentation output mask for each pixel of the medical image or a region of interest of the medical image. The processing component 44 may further utilize a deterministic function to aggregate segmentation output masks for all pixels of the medical image or the region of interest and to output a first classification prediction of the aggregated segmentation output masks. The processing component 44 may further input the medical image into a trained classification network. In certain embodiments, the trained classification network is a separate network from the trained segmentation network. In certain embodiments, the trained classification network and the trained segmentation network are part of the same network. The processing component 44 may still further output a second classification prediction of the medical image or the region of interest. The processing component 44 may further determine an uncertainty between the first classification prediction and the second classification prediction via comparison of the first classification prediction to the second classification prediction.

In certain embodiments, the processing component 44 provides a user-perceptible indication of the uncertainty when present between the first classification prediction and the second classification prediction. In certain embodiments, providing the user-perceptible indication includes causing display of an explanation of the uncertainty in clinical terminology for a user. In certain embodiments, the processing component 44 provides a recommendation to a user to potentially remedy the uncertainty. For example, the remedy may include altering one or more parameters related to the medical image (e.g., altering a filter (e.g., gradient filter) for segmentation or changing a segmentation model utilized). In certain embodiments, these one or more parameters may be automatically altered (e.g., without letting the user know) via the processing component 44 and the analysis (segmentation, classification, uncertainty determination, etc.) of the medical image repeated.

In certain embodiments, the medical image may be an ultrasound image. In certain embodiments, the processing component 44 analyzes an entirety of the ultrasound image. In particular, the processing component 44 analyzes an entirety of the ultrasound image (and an uncertainty determination applied to the analysis) for the presence or absence of a lesion (e.g., tumor). In certain embodiments, the processing component 44 analyzes a region of interest within the ultrasound image (an uncertainty determination applied to the analysis) for the type of lesion (e.g., unilocular lesion, multilocular lesion, solid lesion, etc.).

Ultrasound information may be processed by other or different mode-related modules (e.g., B-mode, Color Doppler, power Doppler, M-mode, spectral Doppler anatomical M-mode, strain, strain rate, and the like) to form 2D or 3D data sets of image frames and the like. For example, one or more modules may generate B-mode, color Doppler, power Doppler, M-mode, anatomical M-mode, strain, strain rate, spectral Doppler image frames and combinations thereof, and the like. The image frames are stored and timing information indicating a time at which the image frame was acquired in memory may be recorded with each image frame. The modules may include, for example, a scan conversion module to perform scan conversion operations to convert the image frames from Polar to Cartesian coordinates. A video processor module may be provided that reads the image frames from a memory and displays the image frames in real time while a procedure is being carried out on a patient. A video processor module may store the image frames in an image memory, from which the images are read and displayed. The ultrasound system 10 shown may comprise a console system, or a portable system, such as a hand-held or laptop-type system.

The ultrasound system 10 may be operable to continuously acquire ultrasound scan data at a frame rate that is suitable for the imaging situation in question. Typical frame rates may range from 20-120 but may be lower or higher. The acquired ultrasound scan data may be displayed on the display 47 at a display-rate that can be the same as the frame rate, or slower or faster. An image buffer may be included for storing processed frames of acquired ultrasound scan data that are not scheduled to be displayed immediately. Preferably, the image buffer is of sufficient capacity to store at least several minutes worth of frames of ultrasound scan data. The frames of ultrasound scan data are stored in a manner to facilitate retrieval thereof according to its order or time of acquisition. The image buffer may be embodied as any known data storage medium.

The display 47 may be any device capable of communicating visual information to a user. For example, the display 47 may include a liquid crystal display, a light emitting diode display, and/or any suitable display or displays. The display 47 can be operable to present ultrasound images and/or any suitable information.

Components of the ultrasound system 10 may be implemented in software, hardware, firmware, and/or the like. The various components of the ultrasound system 10 may be communicatively linked. Components of the ultrasound may be implemented separately and/or integrated in various forms.

Figure 2:
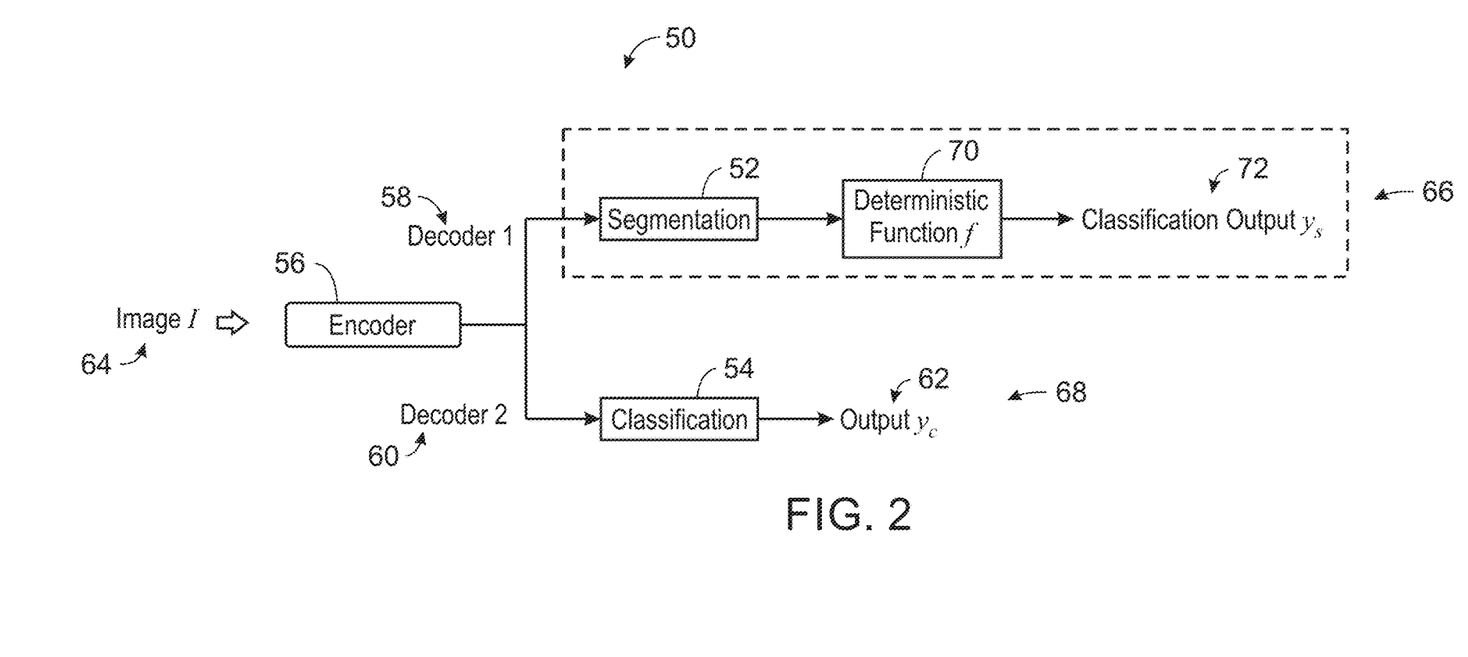
FIG. 2 is a schematic diagram of a model for performing multi-scale interpretation of a medical image, in accordance with aspects of the present disclosure.

FIG. 2 is a schematic diagram of a model 50 (e.g., trained artificial intelligence model) for performing multi-scale interpretation of a medical image. The model 50 may be utilized on an ultrasound image as discussed herein. Also, the model 50 may be utilized on other types of medical images (e.g., derived from conventional X-ray imaging, computed tomography (CT) imaging, nuclear medicine (NM) imaging, magnetic resonance imaging (MRI), or other type of imaging modality). The model 50 includes a trained segmentation network or model 52 (e.g., deep learning-based segmentation network) configured to segment a medical image or a portion of the medical image. The model 50 also includes a trained classification network or model 54 (e.g., deep learning-based classification network) configured to classify a medical image or a portion of the medical image. The segmentation network 52 and the classification network 54 may be trained via supervised learning or semi-supervised learning. In certain embodiments, the trained classification network 54 is a separate network from the trained segmentation network 52. In certain embodiments, the trained classification network 54 and the trained segmentation network 52 are part of the same network.

The model 50 includes an encoder 56 that is configured to receive an input image (e.g., medical image such as an ultrasound image), to generate a high-dimensional feature vector, and to aggregate features at multiple levels. As depicted, both the trained segmentation network 52 and the trained classification network 54 utilize the encoder 56. In certain embodiments, the trained segmentation network 52 and the trained classification network 54 may utilize separate encoders. The trained segmentation network 52 includes a decoder 58 (e.g., decoder 1) that is configured to take the high-dimensional feature vector from the encoder 56 and to generate a segmentation mask for each pixel of either the entire medical image or a region of interest in the medical image. The decoder 58 is also configured to decode features aggregated by the encoder 56 at multiple levels. The trained classification network 54 includes a decoder 60 (e.g., decoder 2) that is configured take the high-dimensional feature vector from the encoder 56, to reconstruct the medical image (e.g., ultrasound image), and to output a classification prediction 62 ($y_c$) having a label for the reconstructed medical image (e.g., reconstructed ultrasound image).

Figure 3:
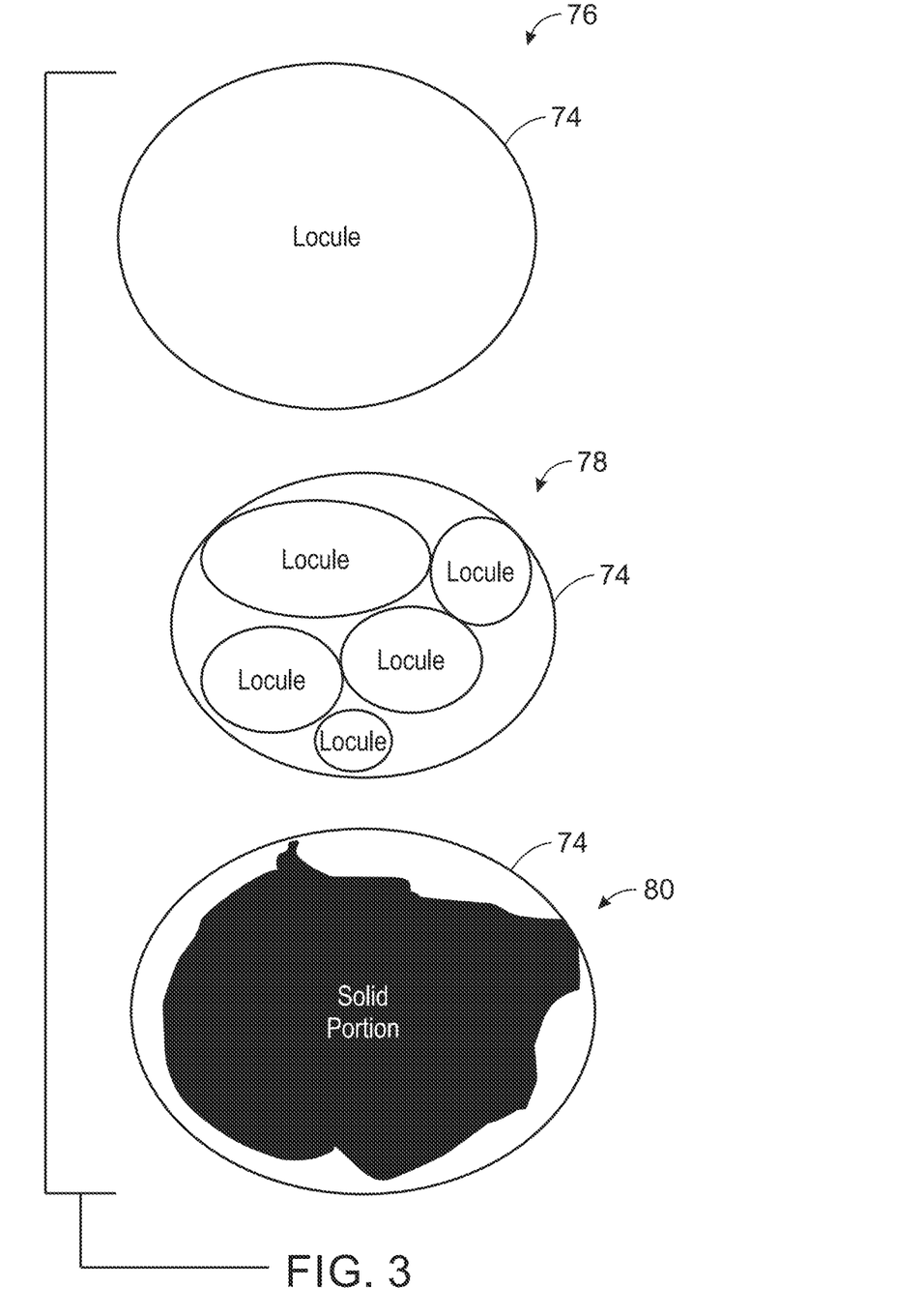
FIG. 3 is a schematic diagram of different types of classification for an ovarian tumor or lesion, in accordance with aspects of the present disclosure

Performing multi-scale interpretation with the model 50 includes inputting an image 64 (I) such as a medical image (e.g., ultrasound image) into the encoder 56 and performing two separate tasks 66, 68 on the inputted image 64. In the first task 66, the trained segmentation network 52 performs segmentation on the image 64 to output a pixel-wise prediction (e.g., segmentation output mask) for each pixel either in the image 64 or a region of interest in the image 64. The model 50 includes a deterministic function 70 ($f$) that aggregates the segmentation output masks for all pixels of the image 64 or the region of interest in the image 64 and outputs a prediction 72 ($y_s$) (e.g., classification label) based on the aggregated segmentation output masks. In certain embodiments, the deterministic function 70 can convert (e.g., via deduction) the aggregated segmentation output masks into the classification label 72. For example, the presence or absence of a region of interest (e.g., lesion or tumor) in the image 64 may be predicted. For example, if a number pixels predicted as a tumor is greater than a size threshold then a tumor may be predicted. In certain embodiments, a segmentation mask may be generated and overlaid on the image 64 for the tumor. In certain embodiments, the deterministic function 70 may be more complicated. For example, in the cases of ovarian tumor classification, multiple labels may be selected from for classifying the lesion or tumor as depicted in FIG. 3. For example, a tumor or lesion 74 may be classified or labeled as unilocular (i.e., having only locule present) for an ovarian tumor as indicated by reference numeral 76. Also, the tumor or lesion 74 may be classified or labeled as multilocular (i.e., having multiple locules present) for an ovarian tumor as indicated by reference numeral 78. Further, the tumor or lesion 74 may be classified or labeled as solid (i.e., having no locules and only having a solid tumor portion) for an ovarian tumor as indicated by reference numeral 80. Returning to FIG. 2, the deterministic function 70 may deduce a multilocular from the predicted segmentation masks when multiple locules are segmented. The deterministic function 70 may deduce a unilocular lesion when a single locule is segmented without a solid portion. The deterministic function 70 may deduce a solid lesion when only a solid portion is segmented.

In the second task 68, the trained classification network 54 directly classifies the image 64 or the region of interest in the image 64 to output the classification prediction 62 (e.g., label). Thus, segmentation in the first task 66 occurs the pixel level (i.e., in a bottom-up manner), while classification in the second task 68 occurs at the image level (i.e., in a to-down manner). The first task 66 or segmentation functions as an explanation for the classification prediction in the second task 68. In particular, first task 66 deduces a top-down label or classification from the bottom-up contents. Disagreement between the classification label and the segmentation-derived label gives rise to uncertainty. Uncertainty is explained as ambiguity between classification labels. In medical image analysis, classification labels tend to have clinical terminology or semantics associated with them. As described in greater detail herein, this ambiguity (when present) is explained in clinical terminology for the benefit of the end user (e.g., clinician such as radiologist or sonographer) to enable them to take the appropriate action.

Figure 4:
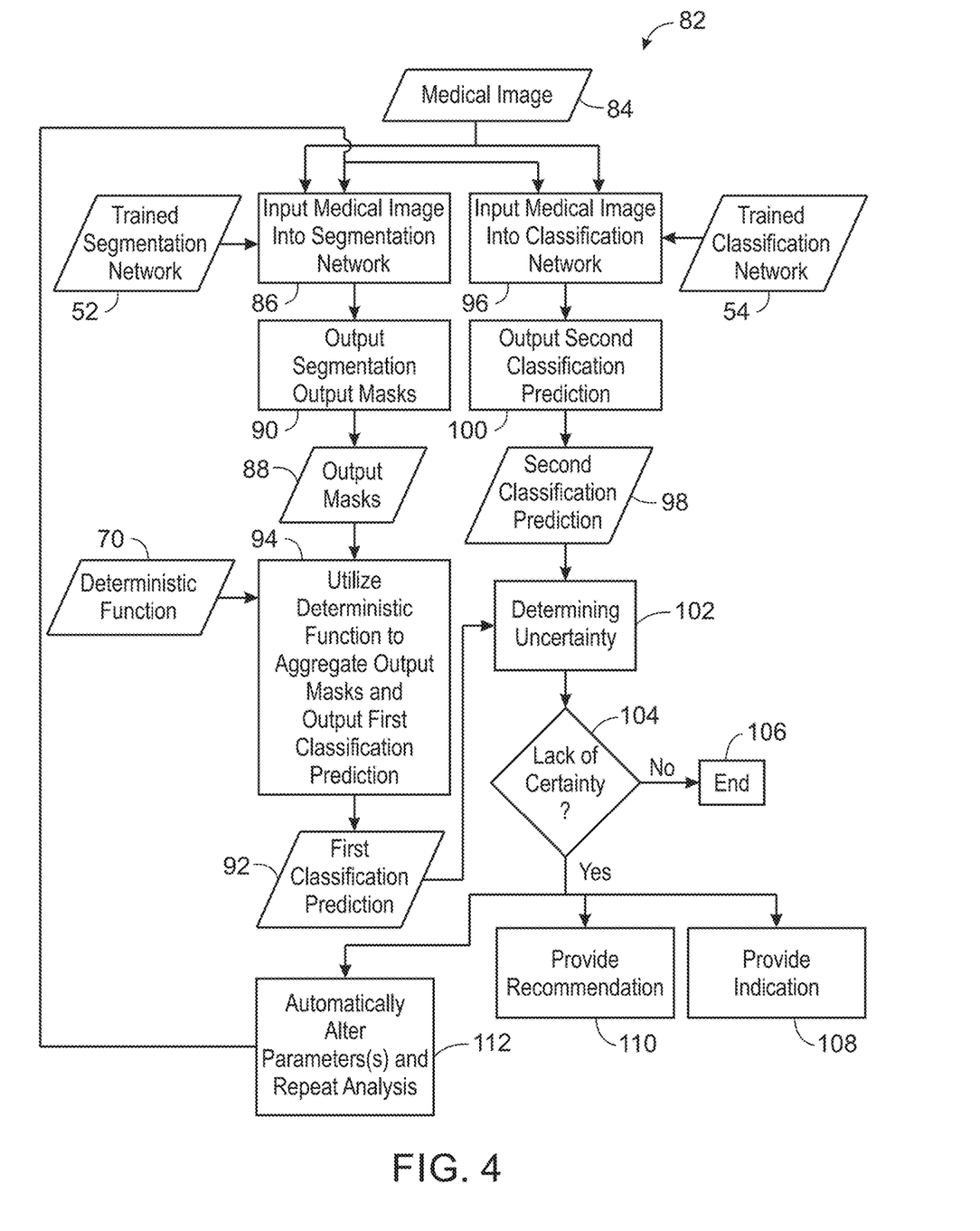
FIG. 4 is a flow chart of a method for analyzing uncertainty in a multi-scale interpretation of a medical image, in accordance with aspects of the present disclosure.

FIG. 4 is a flow chart of a method 82 for analyzing uncertainty in a multi-scale interpretation of a medical image. One or more steps of the method 82 may be performed by processing circuitry of the ultrasound system 10 in FIG. 1 or a remote computing system. One or more steps of the method 82 may be performed simultaneously and/or in a different order shown in FIG. 4. It should be noted that the method 82 may be utilized on other medical images (e.g., derived from conventional X-ray imaging, computed tomography (CT) imaging, nuclear medicine (NM) imaging, magnetic resonance imaging (MRI), or other type of imaging modality) besides ultrasound images.

The method 82 includes inputting a medical image 84 (e.g., ultrasound image) into the trained segmentation network 52 (block 86). The method 82 also includes outputting via the trained segmentation network 52 a segmentation output mask 88 for each pixel of either the medical image 84 or a region of interest of the medical image 84 (block 90). The method 82 further includes utilizing the deterministic function 70 to aggregate the segmentation output masks 88 for the all pixels of either the medical image 84 or the region of interest of the medical image 84 and to output a first classification prediction 92 (e.g., segment-derived classification label) of the aggregated segmentation output masks (block 94).

The method 82 includes inputting the medical image 84 into the trained classification network 54 (block 96). The method 82 also includes outputting a second classification prediction 98 (e.g., classification label) of the medical image 84 or the region of the medical image 84 (block 100).

The method 82 includes determining an uncertainty between the first classification prediction 92 and the second classification prediction 98 via comparison of the first classification prediction 92 and the second classification prediction 98 (block 102). The method 82 includes based on the determined uncertainty determining if there is a lack of certainty (block 104). If there is no lack of certainty, the method 82 ends (block 106).

If there is a lack of certainty, the method 82 includes providing a user-perceptible indication of the uncertainty when present between the first classification prediction 92 and the second classification prediction 98 (block 108). In certain embodiments, providing the user-perceptible indication (e.g., alert) of the uncertainty includes causing a display of an explanation of the uncertainty (e.g., on a console of the ultrasound system 10 or separate display or monitor) in clinical terminology for the user. In certain embodiments, providing the user-perceptible indication of the uncertainty includes showing on the medical image 84 where the uncertainty is occurring. For example, the segmentation mask may be overlaid on the medical image 84 and marked where uncertainty with the segmentation is occurring. In certain embodiments, if there is a lack of certainty, the method 82 includes providing a recommendation (e.g., on a console of the ultrasound system 10 or separate display or monitor) to the user to potentially remedy the uncertainty (block 110). For example, the remedy may include altering one or more parameters related to the medical image (e.g., altering a filter (e.g., gradient filter) for segmentation or changing a segmentation model utilized). In certain embodiments, if there is a lack of uncertainty, the method 82 includes automatically altering one or more parameters related to the medical image or multi-scale analysis of the medical image (e.g., without letting the user know) and repeating the multi-scale analysis (block 112). For example, a filter (e.g., gradient filter) for segmentation may be altered or a segmentation model utilized may be changed.

Repeating the multi-scale analysis (block 112) includes inputting the medical image 84 (e.g., ultrasound image) into the trained segmentation network 52 (block 86). Repeating the multi-scale analysis (block 112) also includes outputting via the trained segmentation network 52 the segmentation output mask 88 for each pixel of either the medical image 84 or the region of interest of the medical image 84 (block 90). Repeating the multi-scale analysis (block 112) further includes utilizing the deterministic function 70 to aggregate the segmentation output masks 88 for the all pixels of either the medical image 84 or the region of interest of the medical image 84 and to output a first classification prediction 92 (e.g., segment-derived classification label) of the aggregated segmentation output masks (block 94).

Repeating the multi-scale analysis (block 112) includes inputting the medical image 84 into the trained classification network 54 (block 96). Repeating the multi-scale analysis (block 112) also includes outputting a second classification prediction 98 (e.g., classification label) of the medical image 84 or the region of the medical image 84 (block 100).

Repeating the multi-scale analysis (block 112) includes determining an uncertainty between the first classification prediction 92 and the second classification prediction 98 via comparison of the first classification prediction 92 and the second classification prediction 98 (block 102). Repeating the multi-scale analysis (block 112) further includes based on the determined uncertainty determining if there is a lack of certainty (block 104). If there is no lack of certainty, the method 82 ends (block 106).

If there is a lack of certainty, repeating the multi-scale analysis (block 112) includes providing a user-perceptible indication of the uncertainty when present between the first classification prediction 92 and the second classification prediction 98 (block 108). In certain embodiments, providing the user-perceptible indication (e.g., alert) of the uncertainty includes causing a display of an explanation of the uncertainty (e.g., on a console of the ultrasound system 10 or separate display or monitor) in clinical terminology for the user. In certain embodiments, providing the user-perceptible indication of the uncertainty includes showing on the medical image 84 where the uncertainty is occurring. For example, the segmentation mask may be overlaid on the medical image 84 and marked where uncertainty with the segmentation is occurring. In certain embodiments, if there is a lack of certainty, repeating the multi-scale analysis (block 112) includes providing a recommendation (e.g., on a console of the ultrasound system 10 or separate display or monitor) to the user to potentially remedy the uncertainty (block 110). For example, the remedy may include altering one or more parameters related to the medical image (e.g., altering a filter (e.g., gradient filter) for segmentation or changing a segmentation model utilized). In certain embodiments, if there is a lack of uncertainty, the method 82 includes automatically altering one or more parameters related to the medical image or multi-scale analysis of the medical image (e.g., without letting the user know) and repeating the multi-scale analysis (block 112). For example, a filter (e.g., gradient filter) for segmentation may be altered or a segmentation model utilized may be changed.

In certain embodiments, the medical image may be an ultrasound image. In certain embodiments, an entirety of the ultrasound image may be analyzed. In particular, an entirety of the ultrasound image may be analyzed (and an uncertainty determination applied to the analysis) for the presence or absence of a lesion (e.g., tumor). In certain embodiments, a region of interest within the ultrasound image may be analyzed (an uncertainty determination applied to the analysis) for the type of lesion (e.g., unilocular lesion, multilocular lesion, solid lesion, etc.).

Figure 5:
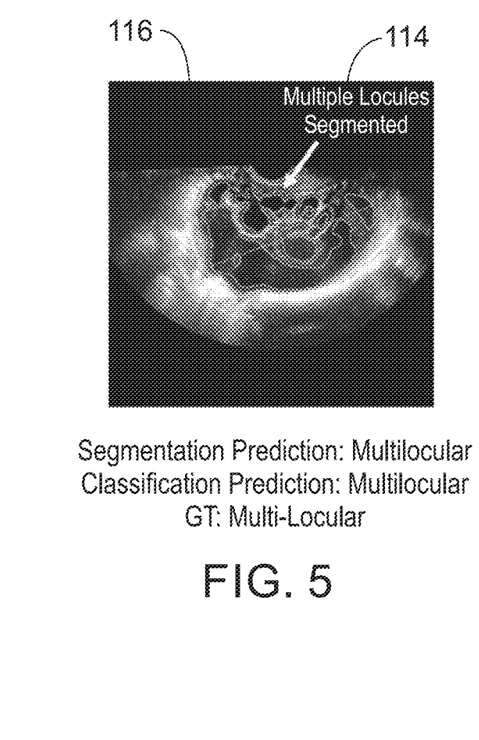
FIG. 5 is schematic diagram of a multi-scale analysis of an ovarian tumor or lesion (e.g., multilocular) in an ultrasound image with no uncertainty, in accordance with aspects of the present disclosure.

FIG. 5 is schematic diagram of a multi-scale analysis of an ovarian tumor or lesion (e.g., multilocular) in an ultrasound image 114 with no uncertainty. The ultrasound image 114 was acquired via a trans-vaginal ultrasound scan. The uncertainty analysis of the multi-scale interpretation of the ultrasound image 114 was conducted utilizing the method 82 in FIG. 4. The lesion in the ultrasound image 114 has multiple locules segmented as indicated by various segmentation masks 116 overlaid on the ultrasound image 114. The segmentation prediction (segmentation-derived classification label) is multilocular. The classification prediction (classification label) is also multilocular. Both the segmentation prediction and the classification prediction agree with each other and correspond with the ground truth (GT) of multilocular. The uncertainty analysis found no uncertainty in the multi-scale interpretation of the ultrasound image 114.

Figure 6:
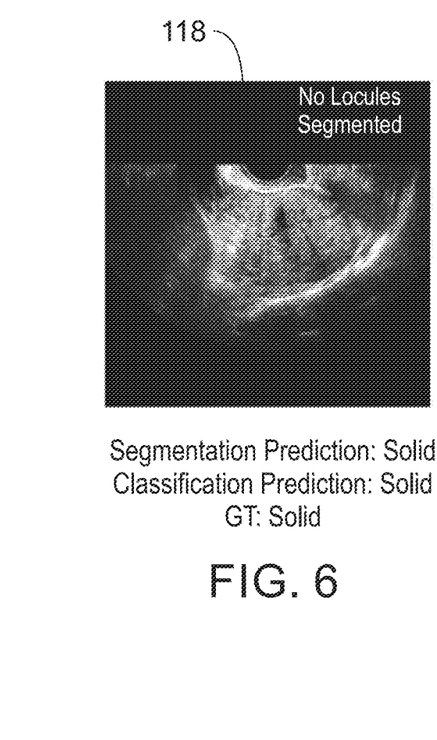
FIG. 6 is schematic diagram of a multi-scale analysis of an ovarian tumor or lesion (e.g., solid) in an ultrasound image with no uncertainty, in accordance with aspects of the present disclosure.

FIG. 6 is schematic diagram of a multi-scale analysis of an ovarian tumor or lesion (e.g., solid) in an ultrasound image 118 with no uncertainty. The ultrasound image 118 was acquired via a trans-vaginal ultrasound scan. The uncertainty analysis of the multi-scale interpretation of the ultrasound image 118 was conducted utilizing the method 82 in FIG. 4. The lesion in the ultrasound image 118 has no locules segmented. The segmentation prediction (segmentation-derived classification label) is solid. The classification prediction (classification label) is also solid. Both the segmentation prediction and the classification prediction agree with each other and correspond with the ground truth (GT) of solid. The uncertainty analysis found no uncertainty in the multi-scale interpretation of the ultrasound image 118.

Figure 7:
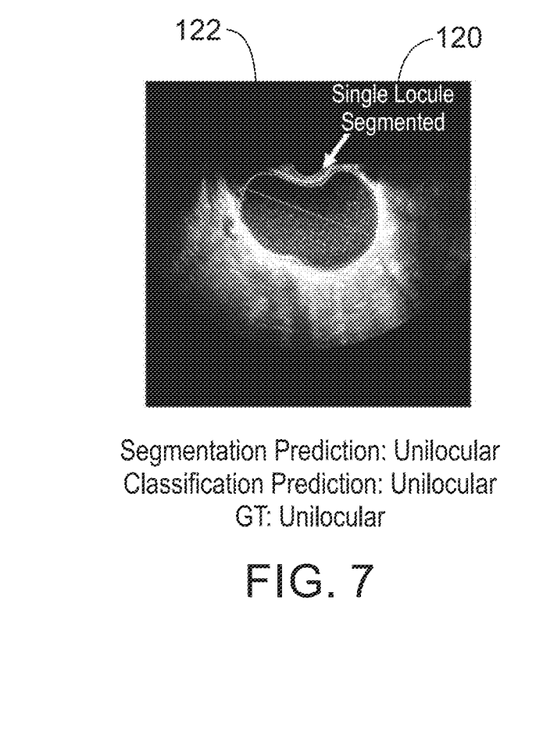
FIG. 7 is schematic diagram of a multi-scale analysis of an ovarian tumor or lesion (e.g., unilocular) in an ultrasound image with no uncertainty, in accordance with aspects of the present disclosure.

FIG. 7 is schematic diagram of a multi-scale analysis of an ovarian tumor or lesion (e.g., unilocular) in an ultrasound image 120 with no uncertainty. The ultrasound image 120 was acquired via a trans-vaginal ultrasound scan. The uncertainty analysis of the multi-scale interpretation of the ultrasound image 120 was conducted utilizing the method 82 in FIG. 4. The lesion in the ultrasound image 120 has a single locule segmented as indicated by a segmentation mask 122 overlaid on the ultrasound image 120. The segmentation prediction (segmentation-derived classification label) is unilocular. The classification prediction (classification label) is also unilocular. Both the segmentation prediction and the classification prediction agree with each other and correspond with the ground truth (GT) of unilocular. The uncertainty analysis found no uncertainty in the multi-scale interpretation of the ultrasound image 114.

Figure 8:
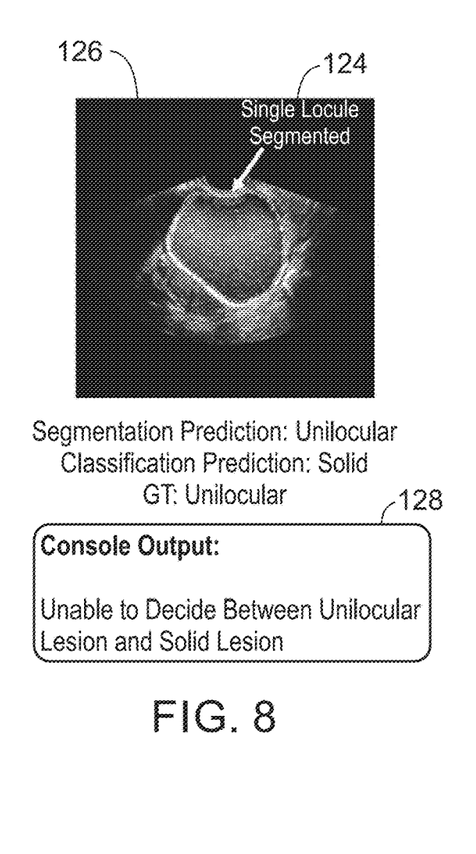
FIG. 8 is schematic diagram of a first example of a multi-scale analysis of an ovarian tumor or lesion (e.g., unilocular) in an ultrasound image with high uncertainty, in accordance with aspects of the present disclosure.

FIG. 8 is schematic diagram of a first example of a multi-scale analysis of an ovarian tumor or lesion (e.g., unilocular) in an ultrasound image 124 with high uncertainty. The ultrasound image 124 was acquired via a transvaginal ultrasound scan. The uncertainty analysis of the multi-scale interpretation of the ultrasound image 124 was conducted utilizing the method 82 in FIG. 4. The lesion in the ultrasound image 124 has a single locule segmented as indicated by a segmentation mask 126 overlaid on the ultrasound image 124. The segmentation prediction (segmentation-derived classification label) is unilocular. The classification prediction (classification label) is solid. The segmentation prediction and the classification prediction disagree with each other. In addition, the classification prediction disagrees with the ground truth (GT) of unilocular. Due to the disagreement, the uncertainty analysis found high uncertainty in the multi-scale interpretation of the ultrasound image 124. Due to determination of high uncertainty, an explanation of the uncertainty is provided to the user as indicated by reference numeral 128. The explanation 128 is in clinical terms so that the user may understand the reason for the uncertainty and take the appropriate actions.

Figure 9:
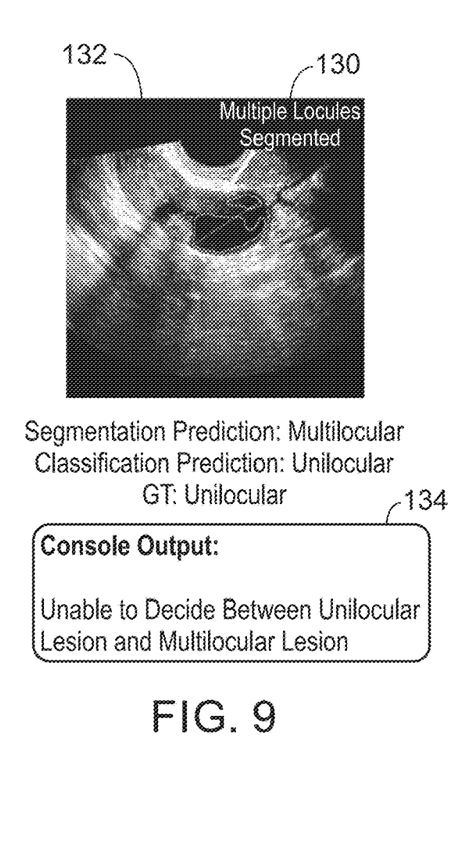
FIG. 9 is schematic diagram of a second example of a multi-scale analysis of an ovarian tumor or lesion (e.g., unilocular) in an ultrasound image with high uncertainty, in accordance with aspects of the present disclosure.

FIG. 9 is schematic diagram of a second example of a multi-scale analysis of an ovarian tumor or lesion (e.g., unilocular) in an ultrasound image 130 with high uncertainty. The ultrasound image 130 was acquired via a transvaginal ultrasound scan. The uncertainty analysis of the multi-scale interpretation of the ultrasound image 130 was conducted utilizing the method 82 in FIG. 4. The lesion in the ultrasound image 130 has multiple locules segmented as indicated by various segmentation masks 132 overlaid on the ultrasound image 130. The segmentation prediction (segmentation-derived classification label) is multilocular. The classification prediction (classification label) is unilocular. The segmentation prediction and the classification prediction disagree with each other. In addition, the classification prediction disagrees with the ground truth (GT) of unilocular. Due to the disagreement, the uncertainty analysis found high uncertainty in the multi-scale interpretation of the ultrasound image 130. Due to determination of high uncertainty, an explanation of the uncertainty is provided to the user as indicated by reference numeral 134. The explanation 134 is in clinical terms so that the user may understand the reason for the uncertainty and take the appropriate actions.

Figure 10:
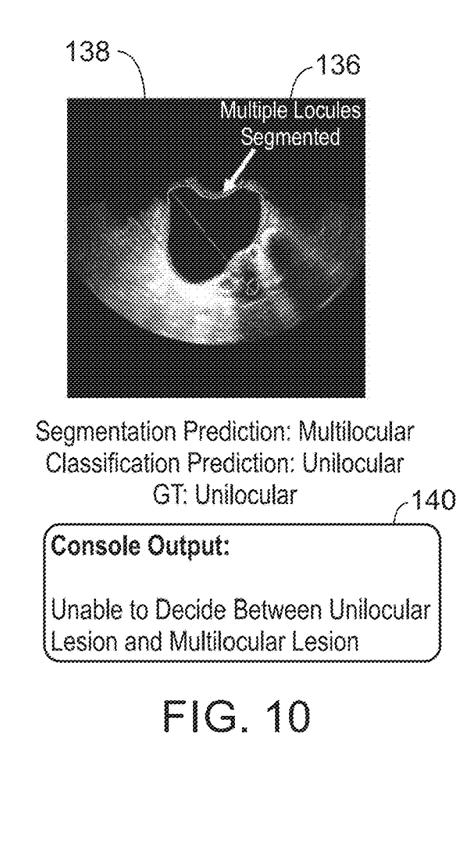
FIG. 10 is schematic diagram of a third example of a multi-scale analysis of an ovarian tumor or lesion (e.g., unilocular) in an ultrasound image with high uncertainty, in accordance with aspects of the present disclosure.

FIG. 10 is schematic diagram of a third example of a multi-scale analysis of an ovarian tumor or lesion (e.g., unilocular) in an ultrasound image 136 with high uncertainty. The ultrasound image 136 was acquired via a transvaginal ultrasound scan. The uncertainty analysis of the multi-scale interpretation of the ultrasound image 136 was conducted utilizing the method 82 in FIG. 4. The lesion in the ultrasound image 136 has multiple locules segmented as indicated by various segmentation masks 138 overlaid on the ultrasound image 136. The segmentation prediction (segmentation-derived classification label) is multilocular. The classification prediction (classification label) is unilocular. The segmentation prediction and the classification prediction disagree with each other. In addition, the classification prediction disagrees with the ground truth (GT) of unilocular. Due to the disagreement, the uncertainty analysis found high uncertainty in the multi-scale interpretation of the ultrasound image 136. Due to determination of high uncertainty, an explanation of the uncertainty is provided to the user as indicated by reference numeral 140. The explanation 140 is in clinical terms so that the user may understand the reason for the uncertainty and take the appropriate actions.

Technical effects of the disclosed embodiments include providing systems and methods for analyzing uncertainty in a multi-scale interpretation of a medical image. Technical effects of the disclosed embodiments include alerting the clinician (e.g., sonographer or radiologist) when there is uncertainty (e.g., disagreement between the classification label and the segmentation derived label) in the model performance (e.g., for medical image analysis). In cases where uncertainty exists, this uncertainty can be explained in clinical terminology for the benefit of the end-user so that the user can take control or take appropriate action (in light of the explanation of the uncertainty) to achieve a better clinical outcome. Technical effects of the disclosed embodiments include providing a one pass uncertainty computation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for analyzing uncertainty in a multi-scale interpretation of a medical image, comprising:

inputting, via a processor, the medical image into a trained segmentation network;

outputting, via the processor, via the trained segmentation network a segmentation output mask for each pixel of the medical image or a region of interest of the medical image;

utilizing, via the processor, a deterministic function to aggregate segmentation output masks for all pixels of the medical image or the region of interest and to output a first classification prediction of the aggregated segmentation output masks;

inputting, via the processor, the medical image into a trained classification network;

outputting, via the processor, a second classification prediction of the medical image or the region of interest; and determining, via the processor, an uncertainty between the first classification prediction and the second classification prediction via comparison of the first classification prediction to the second classification prediction.

2. The computer-implemented method of claim 1, further comprising providing, via the processor, a user-perceptible indication of the uncertainty when present between the first classification prediction and the second classification prediction.

3. The computer-implemented method of claim 2, wherein providing the user-perceptible indication comprises causing display of an explanation of the uncertainty in clinical terminology for a user.

4. The computer-implemented method of claim 2, further comprising providing, via the processor, a recommendation to a user to potentially remedy the uncertainty.

5. The computer-implemented method of claim 1, further comprising automatically altering, via the processor, one or more parameters related to the medical image and then repeating analysis of the medical image.

6. The computer-implemented method of claim 1, comprising:
outputting, via the processor, via the trained segmentation network the segmentation output mask for each pixel of the region of interest;
utilizing, via the processor, the deterministic function to aggregate segmentation output masks for all pixels of the region of interest and to output the first classification prediction of the aggregated segmentation output masks; and
outputting, via the processor, the second classification prediction of the region of interest.

7. The computer-implemented method of claim 6, wherein the medical image comprises an ultrasound image, and the region of interest comprises an ovarian lesion.

8. The computer-implemented method of claim 7, wherein labels to be utilized for both the first classification prediction and the second classification prediction comprise unilocular ovarian lesion, multilocular ovarian lesion, and solid ovarian lesion.

9. The computer-implemented method of claim 1, comprising:
outputting, via the processor, via the trained segmentation network the segmentation output mask for each pixel of the medical image;
utilizing, via the processor, the deterministic function to aggregate segmentation output masks for all pixels of the medical image and to output the first classification prediction of the aggregated segmentation output masks; and
outputting, via the processor, the second classification prediction of the medical image.

10. The computer-implemented method of claim 9, wherein the medical image comprises an ultrasound image.

11. The computer-implemented method of claim 10, wherein labels to be utilized for both the first classification prediction and the second classification prediction comprise presence of a lesion and absence of the lesion.

12. A system for analyzing uncertainty in a multi-scale interpretation of a medical image, comprising:
a memory encoding processor-executable routines; and
a processor configured to access the memory and to execute the processor-executable routines, wherein the processor-executable routines, when executed by the processor, cause the processor to:
inputting the medical image into a trained segmentation network;
outputting via the trained segmentation network a segmentation output mask for each pixel of a region of interest of the medical image;
utilizing a deterministic function to aggregate segmentation output masks for all pixels of the region of interest and to output a first classification prediction of the aggregated segmentation output masks;
inputting the medical image into a trained classification network, wherein the trained classification network is a separate network from the trained segmentation network or both the trained classification network and the trained segmentation network are part of the same network;
outputting a second classification prediction of the region of interest; and
determining an uncertainty between the first classification prediction and the second classification prediction via comparison of the first classification prediction to the second classification prediction.

13. The system of claim 12, wherein the processor-executable routines, when executed by the processor, further cause the processor to provide a user-perceptible indication of the uncertainty when present between the first classification prediction and the second classification prediction.

14. The system of claim 13, wherein providing the user-perceptible indication comprises causing display of an explanation of the uncertainty in clinical terminology for a user.

15. The system of claim 13, wherein the processor-executable routines, when executed by the processor, further cause the processor to provide a recommendation to a user to potentially remedy the uncertainty.

16. The system of claim 12, wherein the processor-executable routines, when executed by the processor, further cause the processor to automatically alter one or more parameters related to the medical image and then repeating analysis of the medical image.

17. A non-transitory computer-readable medium, the computer-readable medium comprising processor-executable code that when executed by a processor, causes the processor to:
inputting a medical image into a trained segmentation network;
outputting via the trained segmentation network a segmentation output mask for each pixel of the medical image or a region of interest of the medical image;
utilizing a deterministic function to aggregate segmentation output masks for all pixels of the medical image or the region of interest and to output a first classification prediction of the aggregated segmentation output masks;
inputting the medical image into a trained classification network;
outputting a second classification prediction of the medical image or the region of interest; and
determining an uncertainty between the first classification prediction and the second classification prediction via comparison of the first classification prediction to the second classification prediction.

18. The non-transitory computer-readable medium of claim 17, wherein the processor-executable code, when executed by the processor, further causes the processor to provide a user-perceptible indication of the uncertainty when present between the first classification prediction and the second classification prediction.

19. The non-transitory computer-readable medium of claim 18, wherein providing the user-perceptible indication comprises causing display of an explanation of the uncertainty in clinical terminology for a user.

20. The non-transitory computer-readable medium of claim 18, wherein the processor-executable code, when executed by the processor, further causes the processor to provide a recommendation to a user to potentially remedy the uncertainty.

* * * * *